United States Patent

[11] 3,626,973

| [72] | Inventor | Richard K. Mason<br>17425 Ludlow, Granada Hills, Calif. 91344 |
| [21] | Appl. No. | 880,773 |
| [22] | Filed | Nov. 28, 1969 |
| [45] | Patented | Dec. 14, 1971 |

[54] IMPROVED ON-OFF FLOW CONTROL VALVE
6 Claims, 2 Drawing Figs.

[52] U.S. Cl...................................................... 137/460,
    137/490, 137/625.69
[51] Int. Cl........................................................ F16k 17/08
[50] Field of Search............................................ 251/33, 35,
    48, 50, 51, 52, 63; 137/490, 491, 87, 460, 625.67,
    625.68, 625.69

[56] References Cited
UNITED STATES PATENTS
2,397,234  3/1946  Blake .............................. 251/33 X
2,729,242  1/1956  Olson .............................. 251/33 X

*Primary Examiner*—William R. Cline
*Attorney*—Nilsson, Robbins, Wills & Berliner ABSTRACT: A slide valve having first and second limit positions for the control of fluid under pressure therethrough by either permitting the fluid to flow or blocking the fluid from flowing. The slide valve is maintained in one position through the application of fluid under pressure to an end area thereof and is translated from that position to the other position by application of force from a spring thereto. The pressure acting upon the end area of the slide valve during normal conditions, overcomes the spring force. Upon relief of the pressure, the spring commences movement of the slide valve. This slide valve is ported from the one end where pressure is applied to the opposite end which is connected to exhaust, or system return, to latch the slide valve in its other position and to provide rapid translation thereof from its one limit position to the other limit position.

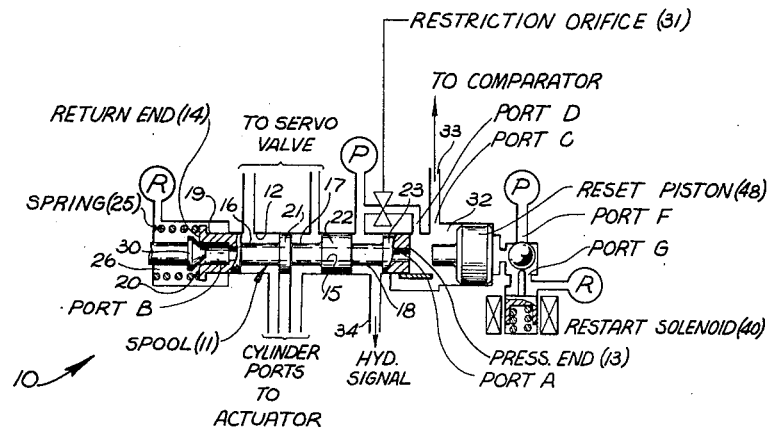

PATENTED DEC 14 1971

- RESTRICTION ORIFICE (31)
- TO COMPARATOR
- PORT D
- PORT C
- RETURN END (14)
- TO SERVO VALVE
- SPRING (25)
- RESET PISTON (48)
- PORT F
- PORT G
- PORT B
- RESTART SOLENOID (40)
- SPOOL (11)
- CYLINDER PORTS TO ACTUATOR
- HYD. SIGNAL
- PRESS. END (13)
- PORT A

Fig 2

- TO COMPARATOR
- PORT D
- PORT C
- RETURN END
- TO SERVO VALVE
- RESET PISTON (48)
- PORT F
- PORT G
- SPRING
- PORT B
- SPOOL
- CYLINDER PORTS TO ACTUATOR
- HYD. SIGNAL
- RESTART SOLENOID (40)
- PRESS END (13)
- PORT A

INVENTOR.
RICHARD K. MASON
BY Nilsson & Robbins
Attorneys

IMPROVED ON-OFF FLOW CONTROL VALVE

BACKGROUND OF THE INVENTION

There are many instances where it is desirable to rapidly control the flow of hydraeric fluid under pressure on a go no-go basis, that is, the fluid may either flow or not flow. The term "hydraeric" is used throughout this specification and the appendant claims is defined as being generic to hydraulics and pneumatics and as synonymous, in the broad sense, with fluid under pressure. One such system wherein it is desirable to thusly control the flow of fluid under pressure is shown and described in U.S. Pat. No. 3,391,611 issued July 9, 1968 to Gavin D. Jenney. The various portions of a control system to which the improved flow control valve of the present invention may be connected could be similar to those shown and described in U.S. Pat. No. 3,391,611, and where legends and description refer to portions of a system herein, such reference will be to similar portions of a system such as that shown in U.S. Pat. No. 3,391,611.

Although the shutoff valve such as shown in U.S. Pat. Nos. 3,391,611 or 3,406,702 issued Oct. 22, 1968 to Gavin D. Jenney, operates quite well for the purposes intended, it has been found that where extremely fast response time is required, such cannot always be obtained with such prior art shutoff valves. The slower operational times of prior art devices, for example, on the order of 10 milliseconds, are necessitated because a given volume of fluid must be moved through relatively long lines before the shutoff valve can translate to the desired shutoff position.

SUMMARY OF THE INVENTION

A slide valve having first and second end areas connected to a source of pressure and exhaust, respectively, is movable between first and second limits. Spring means supplies a force urging said slide valve toward said first limit position. Porting means interconnect said pressure and said exhaust ends of said valve. Valve means is provided and normally closes said porting means during the time said slide valve is in said first position, but opens said porting means immediately upon initial movement of said slide valve toward said second position to vent the pressure to the exhaust end.

DESCRIPTION OF THE DRAWINGS

FIG. 1 is a schematic diagram illustrating an improved on-off flow control valve in accordance with the present invention in one position, permitting fluid to flow therethrough; and FIG. 2 illustrates the improved on-off flow control valve of FIG. 1 in its opposite or shutoff position.

DESCRIPTION OF THE PREFERRED EMBODIMENT

As is shown in FIG. 1, the slide valve, illustrated generally at 10, includes a spool 11 disposed within a bore 12 and slidable therein between limit positions, one of which is shown in FIG. 1, and the other of which is shown in FIG. 2. The spool 11 includes a pressure end area 13 and a return or exhaust end area 14. A bore is provided completely through the spool 11 as shown at 15, and defines port A at the pressure end 13 and port B at the return end 14 thereof. The spool 11 includes reduced diameter portions 16, 17 and 18 thereby defining lands 19, 21, 22 and 23 thereon. A spring 25 is positioned within an end chamber 26 defined by the bore 12 and the end 14, and engages the return end 14 of the spool 11 thereby continuously urging the spool 11 away from the position illustrated in FIG. 1. While in the position shown in FIG. 1, a poppet valve 30 engages a seat 20 defined between port B and the return end 14 of the spool 11 thereby closing the bore 15 at the return end 14 of the spool 11. System pressure P is connected through restriction orifice 31 and port D to a chamber 32 thereby applying system pressure P to the pressure end 13 of the spool 11. A conduit 33 is connected to a failure indicating apparatus such as a comparator as described in U.S. Pat. No. 3,391,611. During normal operating conditions a comparator of this type blocks the conduit 33 so that system pressure remains in the chamber 32. However, upon a failure occurring, as described in U.S. Pat. No. 3,391,611 system return or exhaust is connected to the conduit 33 through port C in the bore 12.

From the foregoing description it should now become apparent to those skilled in the art that during the normal operating conditions the poppet valve is firmly seated against the seat 20. That is, in the absence of a failure occurring and while system pressure is connected to the chamber 32, the application of the pressure to the end area 13 of the spool 11 forces the spool 13 toward the left or first limit position. As shown, any communication between system pressure in the chamber 32 and system return in the chamber 26 is precluded. During this operational condition, the servovalve is connected to cylinder ports which are connected to the actuator and flow of fluid between the servovalve and the actuator is maintained in accordance with applications of signals to the servovalve as is well known in the art, and is more specifically described in U.S. Pat. No. 3,391,611. Under these circumstances, if such is desired, an additional conduit as shown at 34, may be provided to conduct a hydraeric signal to an indicating apparatus such as a pressure switch or lamp thereby providing an indicator to the operator that the system is functioning properly.

Assuming now, for purposes of discussing, that the comparator has detected a discrepancy and thereby noted a failure, and has operated so as to connect system return to the conduit 33. Under these conditions, in view of the restriction orifice 31, the pressure appearing in chamber 32 drops since fluid under pressure cannot be provided rapidly from source P through the restriction orifice 31 to the chamber 32. As a result of the drop in pressure in chamber 32, the force of the spring 25 acting against the return end 14 of the spool 11 causes the spool 11 to begin to translate toward the right, as shown in FIG. 1. Initially some movement of fluid present in chamber 32 must occur against whatever pressure appears in chamber 32. However, upon the initial movement of the spool 11 port B is opened since the seat 20 is moved away from the poppet 30. Such movement immediately interconnects system return R from the chamber 26, through the bore 15 to the chamber 32. Any fluid appearing in chamber 32 of a pressure greater than that appearing in chamber 26 is, therefore, immediately transmitted through the bore 15 to system return R and the pressures in chamber 32 and 26 are immediately equalized. Such equalization permits the force of the spring 25 to rapidly translate the spool 11 to its opposite limit position as shown in FIG. 2. That is, the volume of fluid appearing in the chamber 32 must be moved out of chamber 32 before the spool can fully translate. By venting chamber 32 to chamber 26, the movement of such fluid is very rapid and thus movement of the valve is rapid, for example, about 1 millisecond.

As shown in FIG. 2, the land 22 has blocked system pressure P from the conduit 34 while the land 23 has connected system return R thereto thus providing a signal indicating failure to the operator. Land 23 has also blocked port B thereby precluding any further application of pressure to the chamber 32. It will also be noted that the land 19 now blocks one of the conduits to the servovalve while the lands 21 and 22 block the other. Simultaneously the reduced diameter portion 16 between the lands 19 and 21 interconnects the actuator cylinder port conduits.

If it becomes desirable or required to reset the shutoff valve in accordance with the present invention from the position shown in FIG. 2 to the opposite limit position as shown in FIG. 1, a restart solenoid, shown generally at 40, is provided. The restart solenoid 40 includes a plunger 41 which is spring loaded by the spring 42 to the position illustrated so as to maintain a ball 43 in position to block port F which is connected to system pressure P as shown at 44. System return as shown at 45 is connected by conduit 46 to port G which, in the position illustrated, is normally open thereby applying system return to an end area 47 of reset piston 48. A shaft 49 extends from the opposite side of the reset piston 48 into engagement with the pressure end 13 of the spool 11. Upon energization of the restart solenoid 40 by application of electrical current to the coil 51 thereof, the plunger 41 is attracted downwardly against the force of the spring 42 thereby releasing the ball 43. System pressure moves the ball 43 into engagement with and seals port G. Hydraeric fluid is therefore applied through port F into engagement with end area 47 of the reset piston 48. The application of system pressure across this area generates force sufficient to overcome the force of the spring 25 acting upon the return end 14 of the spool 11. Thus, the spool 11 is translated from the position shown in FIG. 2 to the position shown in FIG. 1. Upon such translation port D is again opened and system pressure is permitted to enter chamber 32 through the restriction orifice 31. After sufficient time delay to permit pressure to build up in chamber 32 to a degree sufficient so that the force developed by application of the pressure chamber 32 against the pressure end 13 of the spool 11 overcomes the force of spring 25, the signal may be removed from the coil 51 of the restart solenoid 40. Thereupon the spring 42 moves the ball 43 into engagement with and seals port F and returns system return 45 into application with end 47 of the reset piston 48. This movement of the ball 43 then permits the pressure appearing in chamber 32 to act against the opposite end of the reset piston 48 and return it to the position shown in FIGS. 1 and 2.

What is claimed is:

1. An on-off control valve comprising:

a housing defining a bore having first and second end chambers and flow ports therein;

a valve member having first and second ends positioned in said first and second end chambers respectively and being slidably positioned in said bore for movement between first and second limit positions to control fluid flow through said flow ports;

means for moving said valve member between said first and second limit positions;

a passageway defined by said valve member directly interconnecting said first and second ends;

means connecting a source of hydraeric pressure to said first end chamber for urging said valve member toward said first limit position;

means exhausting said second end chamber;

spring means engaging said valve member for continuously urging said valve member toward said second limit position, the force of said spring means being less than the force of said pressure against said first end of said valve member; and means sealing said passageway during the time said valve member is in said first limit position and opening said passageway when the force of said pressure acting against said first end area of said valve member falls below the force of said spring means and said valve member commences movement toward said second limit position.

2. An on-off flow control valve as defined in claim 1 further including a reset means positioned to overcome said spring means and move said valve member toward said first limit position.

3. An on-off flow control valve as defined in claim 2 wherein said reset means includes a piston slidably positioned in said first chamber and means for moving said piston toward said first limit position.

4. An on-off flow control valve as defined in claim 3 wherein said piston effectively seals said passageway by engaging said first end of said valve member during the time said reset means is operative.

5. An on-off flow control valve as defined in claim 1 wherein said valve member is a spool and said passageway is an axial bore through said spool.

6. An on-off flow control valve as defined in claim 1 wherein said sealing means is a stationary poppet affixed in said second chamber and axially aligned with said passageway thereby to seat thereon when said spool is in said first limit position.

* * * * *